United States Patent [19]

Tkach et al.

[11] Patent Number: 5,589,201
[45] Date of Patent: Dec. 31, 1996

[54] APPARATUS FOR GAUGE DISTRIBUTION IN A TUBULAR PLASTIC FILM

[75] Inventors: Peter V. Tkach; Frank G. Oplt, both of Mississauga, Canada

[73] Assignee: Macro Engineering & Technology Inc., Mississauga, Canada

[21] Appl. No.: 437,075

[22] Filed: May 5, 1995

[51] Int. Cl.$^6$ .................................................. B29C 53/20
[52] U.S. Cl. ............................................. 425/66; 425/327
[58] Field of Search ........................... 425/72.1, 326.1, 425/327, 325, 387.1, 66, 394, 397; 264/565, 563, 566, 209.2, 209.3

[56] References Cited

U.S. PATENT DOCUMENTS

| | | | |
|---|---|---|---|
| 2,844,846 | 7/1958 | Kronholm | 425/326.1 X |
| 3,804,572 | 4/1974 | Upmeier | 425/326.1 |
| 4,643,656 | 2/1987 | Karl | 425/387.1 X |
| 4,650,406 | 3/1987 | Peters | 425/72.1 |
| 4,676,728 | 6/1987 | Planeta | 264/209.2 X |
| 4,836,744 | 6/1989 | Karl et al. | 425/72.1 |
| 5,437,544 | 8/1995 | Achelpohl | 264/565 X |

Primary Examiner—Richard L. Chiesa
Attorney, Agent, or Firm—Rogers & Scott

[57] ABSTRACT

Apparatus for effecting gauge distribution in flattened tubular plastic film has a collapsing device for collapsing upwardly vertically moving expanded tubular plastic film to a two layer flattened condition, a first motor for rotating the collapsing device through 180° in each direction from a neutral position, a first horizontal film direction reverser secured to the collapsing device for rotation therewith a first horizontal turning bar located above the collapsing device and extending substantially through the central axis, a second horizontal film direction reverser, and a second horizontal turning bar located about the first turning bar. A second motor arrangement simultaneously rotates the first turning bar through 135° in each direction from a neutral position, the second film direction reverser through 90° in each direction from the neutral position and the second turning bar through 45° in each direction from the neutral position simultaneously with the 180° rotation of the collapsing device and first direction reverser by the first motor, and thereby distributes gauge variations in the two layer flattened film leaving the collapsing device across the width of the flattened film.

12 Claims, 8 Drawing Sheets

APPARATUS FOR GAUGE DISTRIBUTION IN A TUBULAR PLASTIC FILM

FIELD OF THE INVENTION

This invention relates to apparatus for gauge distribution in a tubular plastic film.

BACKGROUND OF THE INVENTION

It is well known that, when tubular plastic film is extruded in a molten state from an annular die and then proceeds as an air filled bubble before being flattened by passing through a collapsing frame and between a pair of nip rollers, irregularities occur in the thickness (i.e. gauge) of the film. Since the film is usually then wound onto a storage roll, it is necessary to provide apparatus for moving the two layers of the flattened film relatively to one another so than an irregularity in film thickness, i.e. in its gauge, is distributed across the width of the storage roll to avoid the problems which would arise if this was not done. This process is commonly known as gauge distribution, and various types of apparatus have previously been used for this purpose. One type of gauge distribution apparatus is described in U.S. Pat. No. 4,676,728 issued Jun. 30, 1987, to Mirek Planeta, the contents of which are hereby incorporated herein by reference.

As typically shown in this prior patent, gauge distribution is effected by passing the flattened tubular film around turning bars whose angular orientation with respect to the film is varied. In such prior art, such variation of angular orientation has, for one reason or another, not been centred about the longitudinal axis of the extruded tubular film bubble, and this causes problems for which compensation must be provided.

OBJECT OF THE INVENTION

It is therefore an object of the present invention to provide gauge distribution apparatus in which variation of the angular orientation of the turning bars is centred on the longitudinal axis of the extruded film bubble.

STATEMENT OF THE INVENTION

According to the invention, apparatus for effecting gauge distribution in flattened tubular plastic film comprises collapsing means for collapsing upwardly vertically moving expanded tubular plastic film to a two layer flattened condition, the collapsing means being located above the upwardly moving expanded tubular plastic film and aligned with the longitudinal central axis thereof, the collapsing means being rotatable about the central axis. A first motor rotates the collapsing means about the central axis through 180° in each direction from a neutral position. A first horizontal film direction reverser is secured to the collapsing means for rotation therewith and is laterally spaced from the central axis for reversing the direction of travel of the flattened film leaving the collapsing means from a radially outward direction away from the central axis to a radially inward direction towards the central axis. A first horizontal turning bar is located above the collapsing means and extends substantially through the central axis, i.e. through or close to the central axis, for receiving the flattened film from the film direction reverser, the flattened film passing around the first turning bar and leaving the first turning bar in a radially outward direction. A first turning bar carrier carries the first turning bar and is rotatable about the central axis to rotate the first turning bar.

The apparatus also includes a second horizontal film direction reverser laterally spaced from the central axis for reversing the direction of travel of the flattened film leaving the first turning bar from a radially outward direction to a radially inward direction towards the central axis. A direction reverser carrier is rotatable about the central axis and carries the second film direction reverser for rotation therewith. A second horizontal turning bar is located above the first turning bar and extends substantially through the central axis, i.e. through or close to the central axis, for receiving the flattened film from the second film direction reverser, the flattened film passing around the second turning bar and leaving the second turning bar in a radially outward direction. A second turning bar carrier carries the second turning bar and is rotatable about the central axis to rotate the second turning bar horizontally. A second motor means is provided for simultaneously rotating the first turning bar carrier to rotate the first turning bar about the central axis through 135° in each direction from a neutral position, rotating the second film direction reverser about the central axis through 90° in each direction from the neutral position and rotating the second turning bar carrier to rotate the second turning bar about the central axis through 45° in each direction from the neutral position simultaneously with the rotation of the collapsing means and the first direction reverser by the first motor, and thereby distribute gauge variations in the tubular flattened film leaving the collapsing means across the width of the flattened film.

The second motor means may comprise a single shaft with an output shaft carrying first, second and third gears, the first turning bar carrier having a fourth gear associated therewith engaging the first gear, the direction reverser carrier having a fifth gear associated therewith engaging the second gear, and the second turning bar carrier having a sixth gear associated therewith engaging the third gear.

The output shaft may extend vertically adjacent the first turning bar carrier, the direction reverser carrier and the second turning bar carrier, the first, second and third gears being vertically spaced along the output shaft, and the forth, fifth and sixth gears being carried by the first turning bar carrier, the direction reverser carrier and the second turning bar carrier respectively in vertically spaced relationship.

The output shaft may extend vertically at a location above the first turning bar carrier, the direction reverser carrier and the second turning bar carrier, the first, second and third gears being vertically spaced along the output shaft, the fourth, fifth and sixth gears being carried by first, second and third vertical shafts, the first shaft extending from the first turning bar carrier, the second shaft extending from the direction reverser carrier and the third shaft extending from the second turning bar carrier, one of said shafts being an outer annular shaft, another of said shafts being a middle annular shaft within the outer annular shaft, and the other shaft being an inner shaft within the middle annular shaft.

The second motor means may comprise a second motor carried for rotation with the collapsing means and drivingly connected to the first turning bar carrier, a third motor carried by the first turning bar carrier and drivingly connected to the direction reverser carrier, and a fourth motor carried by the direction reverser carrier and drivingly connected to the second turning bar carrier.

The first turning bar carrier may comprise a C-shaped bracket mounted above and rotatable relative to the support structure, said first C-shaped bracket carrying the first turning bar within the C-shape thereof. The second turning bar carrier may comprise a second C-shaped bracket mounted above and rotatable relative to the first C-shaped bracket, said second C-shaped bracket carrying the second turning bar within the C-shape thereof.

The direction reverser carrier carrying the second film direction reverser may comprise a radially extending arm located between the first and second C-shaped brackets and rotatable relative thereto. The first C-shaped bracket, the direction reverser carrier carrying the second film direction reverser and the second C-shaped bracket may be carried by the support structure and be rotatable relative thereto.

The second motor means may comprise a second motor carried by the main frame and having a vertical output shaft carrying the vertically spaced gear wheels, said first C-shaped bracket being drivingly connected to a first one of said gear wheels, said second direction reverser being drivingly connected to a second one of said gear wheels, and said second C-shaped bracket being drivingly connected to a third one of said gear wheels.

Alternatively, the second motor means may comprise a second motor carried by the support structure and drivingly connected to the first C-shaped bracket, a third motor carried by the first C-shaped bracket and drivingly connected to the second direction reverser carrier, and a fourth motor carried by the second direction reverser carrier and drivingly connected to the second C-shaped bracket.

The main frame may have a cross member above the first turning bar, the second direction reverser and the second turning bar, and the second motor means is mounted on said cross member, said second motor means having a vertical output shaft carrying three vertically spaced gear wheels, and said apparatus also includes a vertical outer drive sleeve journalled in said cross member and carrying the first turning bar, an inner drive sleeve journalled in the outer sleeve and carrying the second direction reverser, and an inner drive shaft journalled in the inner sleeve and carrying the second turning bar, the outer sleeve being drivingly connected to a first one of said gear wheels, the inner sleeve being drivingly connected to a second one of said gear wheels, and the inner shaft being drivingly connected to a third one of said gear wheels.

The outer sleeve may carry a first C-shaped bracket having the first turning bar carrier mounted at a lower end thereof, the inner sleeve carries a C-shaped bracket within the first C-shaped bracket having the second direction reverser carrier mounted at a lower end thereof, and the inner shaft has the second turning bar carrier mounted on a lower end thereof.

BRIEF DESCRIPTION OF THE DRAWINGS

Embodiments of the invention will now be described, by way of example, with reference to the accompanying drawings, of which.

DESCRIPTION OF THE PREFERRED EMBODIMENTS

Figure 1:
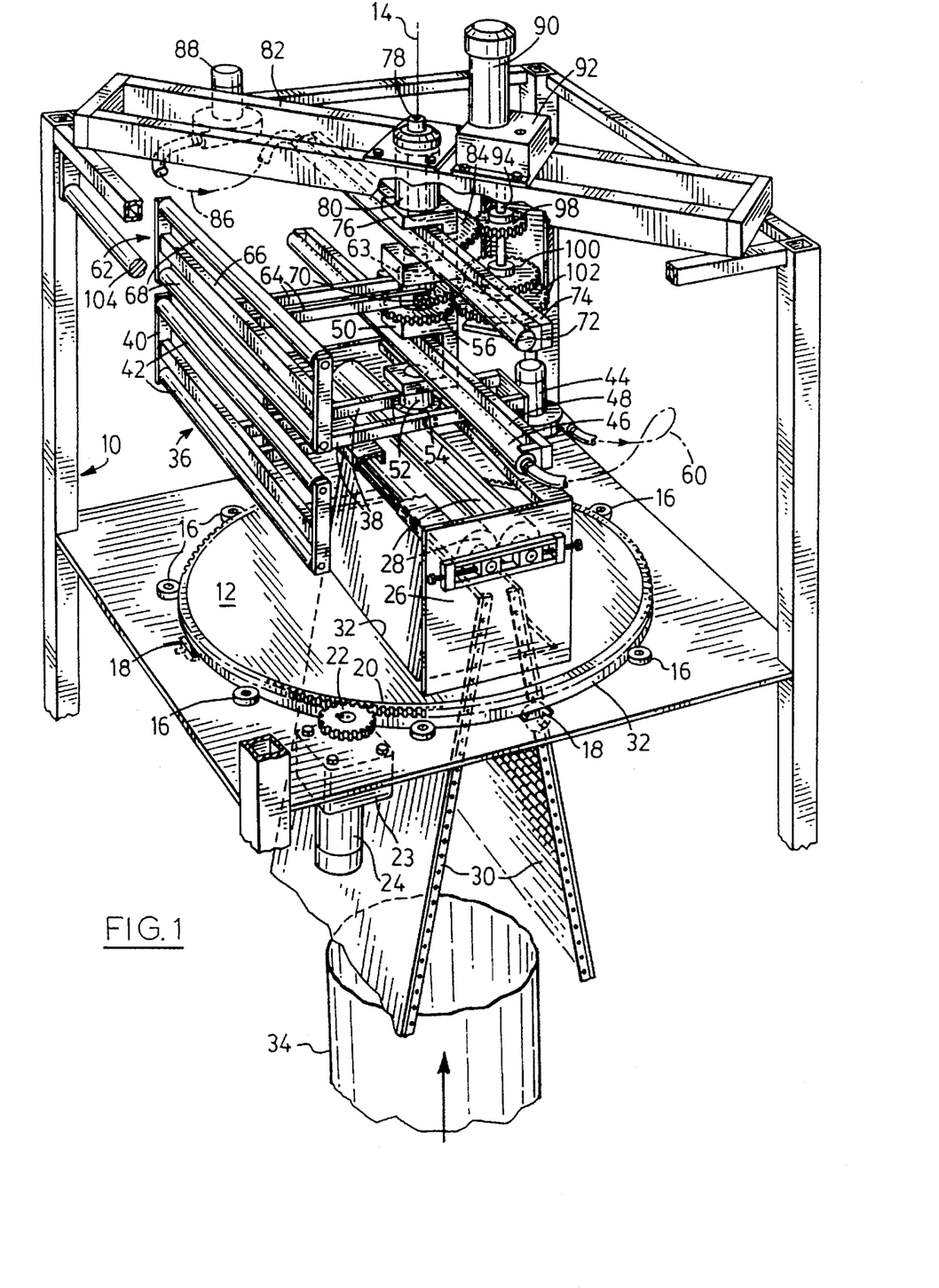
FIG. 1 is a perspective view of apparatus for effecting gauge distribution of tubular plastic film in accordance with a first embodiment of the invention, the rotatable components being shown in a neutral position.

Referring to the drawings, FIG. 1 shows apparatus for effecting gauge distribution in flattened tubular plastic film in accordance with one embodiment of the invention. The apparatus has a support frame 10 with a circular rotor 12 mounted thereon for rotation about the central vertical axis 14 by means of horizontal guide rollers 16 and vertical guide rollers 18. A gear 20 is secured around the periphery of the rotor 12 and is engaged by drive sprocket 22 driven through a gearbox 23 by a first electric motor 24. The rotor 12 carries a supporting structure 26 for a pair of nip rolls 28. A pair of upwardly and inwardly inclined collapsing frames 30 project upwardly through an aperture 32 in the rotor 12 and are secured thereto for rotation therewith in any suitable manner as will be readily understood by a person skilled in the art.

The arrangement as so far described is generally similar to that described in my prior U.S. Pat. No. 4,676,728, see especially FIG. 1 thereof, except that in the present embodiment, the nip rolls 28 are spaced above the rotor 12 and the collapsing frames 30 project upwardly therethrough. As is well known in the art, the upwardly vertically moving expanding tubular plastic film 34 from an annular extrusion die (not shown) and expanded by contained air is collapsed to a two layer flattened condition by the collapsing frames 30 and then passes upwardly between the nip rolls 28.

In accordance with the present invention, the supporting structure 26 for the nip rolls 28 also carries a first horizontal film direction reverser 36 which is laterally spaced from the central axis 14 and which rotates about the axis 14 with the collapsing frame 30 and the nip rolls 28 when the rotor 12 is rotated by the motor 24. The direction reverser 36 has a pair of radially extending arms 38 which are mounted on top of the support structure 26 and which carry a vertical roller frame 40 at their radially outer ends, the frame 40 carrying a pair of vertically spaced horizontal rotatable film direction reversing rollers 42. The other end of the arms 38 carry an electrically-driven air blower 44 which supplies air under pressure for a purpose which will be described later. As will also be described later, the motor 24 can be operated to rotate the rotor 12, together with the collapsing frames 30, nip rollers 28 and the first direction reverser 36, through 180° in each direction from the neutral position shown in FIGS. 1 to 3.

A first horizontal turning bar 46 is located above the collapsing frame 30 and nip rolls 28 and is mounted on a radially extending arm 48 carried by a first C-shaped bracket 50, the lower end of which has a downwardly projecting stub-shaft 52 rotatable in a bearing 54 mounted between the arms 38. The upper end of the C-shaped bracket 50 carries a gear wheel 56 which, as will be described later, can be driven to rotate the first turning bar 46 through 135° about the central axis 14 in each direction from the neutral position shown in FIGS. 1 to 4. As shown in FIG. 5, the turning bar 72 is hollow and has apertures 57 in the portion of its periphery around which the flattened tubular film 34 passes, as will be described later. Output of the air blower 44 is connected by flexible tubing 86 to the interior of the turning bar 72 so that air is blown through the apertures 57 to provide an air cushion, i.e. an air bearing, for the film 34 as it passes around the turning bar 46.

A second film direction reverser 62 has a vertical stub shaft 63 with its lower end rotatably mounted in a bearing (not shown) mounted in gear 54 at the upper end of C-shaped bracket 50. A pair of arms 64 extend radially outwardly from opposite sides of the stub shaft 63 and carry a vertical roller frame 66 at their radially outer ends. The frame 66 carries a pair of vertically spaced horizontal rotatable film direction reversing rollers 68. The stub shaft 63 also carries a gear wheel segment 70 and, as will be described later, can be driven to rotate the second direction reverser 62 through 90° about the central axis 14 in each direction from the neutral position shown in FIGS. 1 to 3.

A second horizontal turning bar 72 is located above the first turning bar 46 and is mounted on a radially extending arm 74 carried by the second C-shaped bracket 76, the lower end of which has a bearing (not shown) receiving the upper end of stub-shaft 63. The upper end of C-shaped bracket 76 carries an upwardly projecting shaft 78 which extends into a bearing 80 carried by a cross member 82 mounted on the top of the support frame 10. The C-shaped bracket 76 carries gear segment 84 which, as will be described later, can be driven to rotate the second turning bar 72 through 45° about the central axis 14 in each direction from the neutral position shown in FIGS. 1 to 3. The second turning bar 72 is of similar construction to the first turning bar 46 and is supplied with air through tubing 86 from a second electrically driven air blower 88 mounted on support frame 10.

A second electrically driven motor 90 and gear box 92 are mounted on the cross-member 82, the gear box 92 having a drive shaft 94 projecting downwardly into the interior of support frame 10 near the central axis 14. The drive shaft 94 carries three vertically spaced gear wheels 98, 100, 102 of different diameters. The lowest and largest diameter gear wheel 102 engages the gear wheel 56 associated with the first turning bar 46. The middle gear wheel 100, which is smaller than the gear wheel 102, engages the gear segment 70 associated with the second film direction reverser 62. The uppermost and smallest gear wheel 98 engages the gear segment 84 associated with the second turning bar 72.

Figure 3:
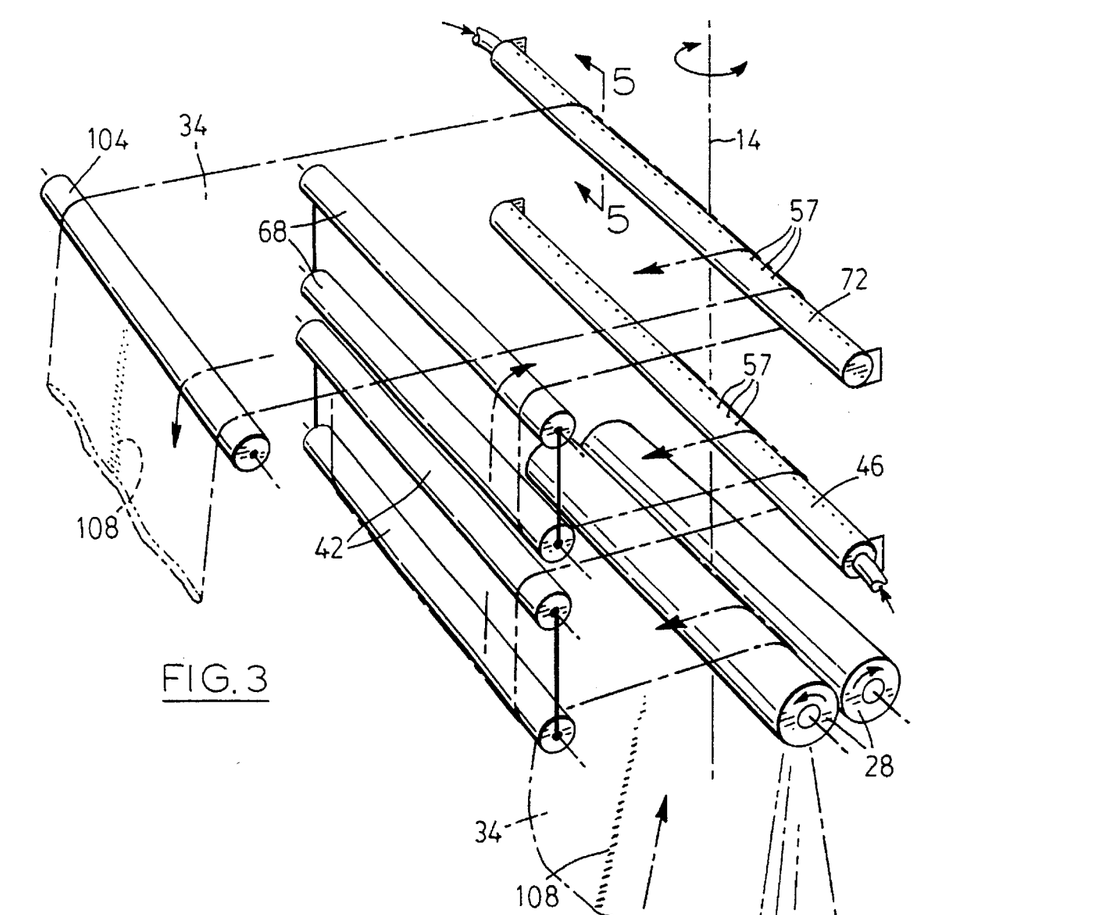
FIG. 3 is a diagrammatic view showing how the film passes through the apparatus of FIG. 1, the rotatable components again being shown in the neutral position.
Figure 6:
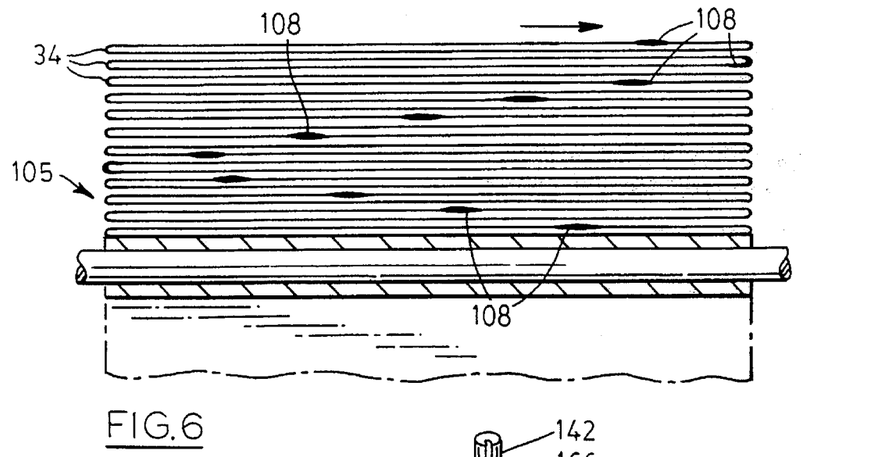
FIG. 6 is a longitudinal cross-sectional view of a roll of film after passing through the apparatus showing the distribution across the width of the film of an irregularity in the gauge of the film.

As shown in FIG. 3, the collapsing film 34 passes upwardly through nip rolls 28 to become a two layer flattened film, travels radially outwardly to the first direction of reversing rollers 42, radially inwardly to pass around the first turning bar 46, radially outwardly to pass around the second direction reversing rollers 68 and radial inwardly to pass around the second turning bar 72. After passing around the turning bar 72, the flattened film 34 travels radially outwardly and then passes over an exit roller 104 carried by the support frame 10 to a wind-up roll 105 (shown in FIGS. 4 and 6) which is rotatably driven (by means not shown) to cause the film to be drawn through the nip rolls 28 and the remainder of the apparatus as described above.

Figure 2:
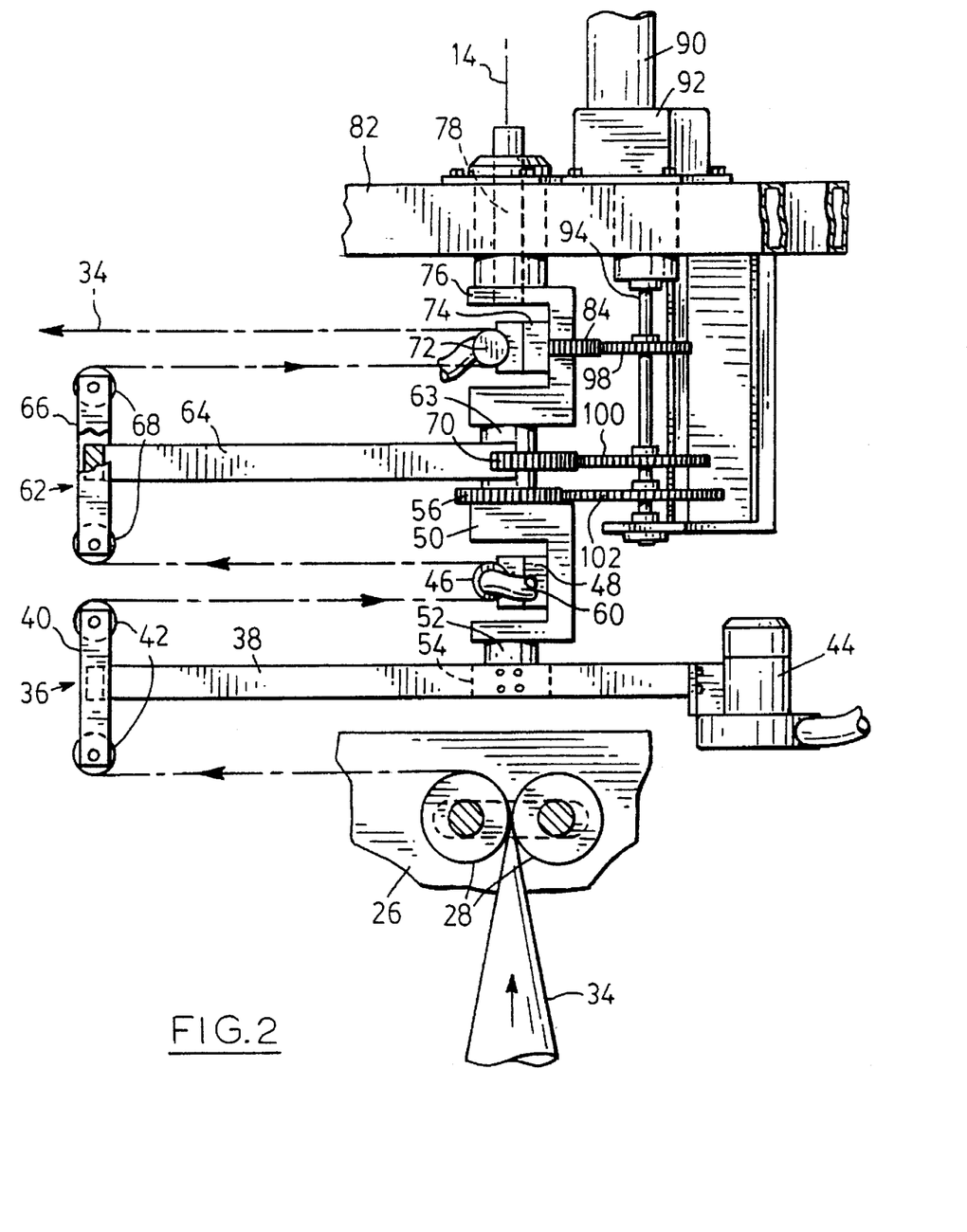
FIG. 2 is a side view of the apparatus of FIG. 1, some parts being omitted for clarity.
Figure 4:
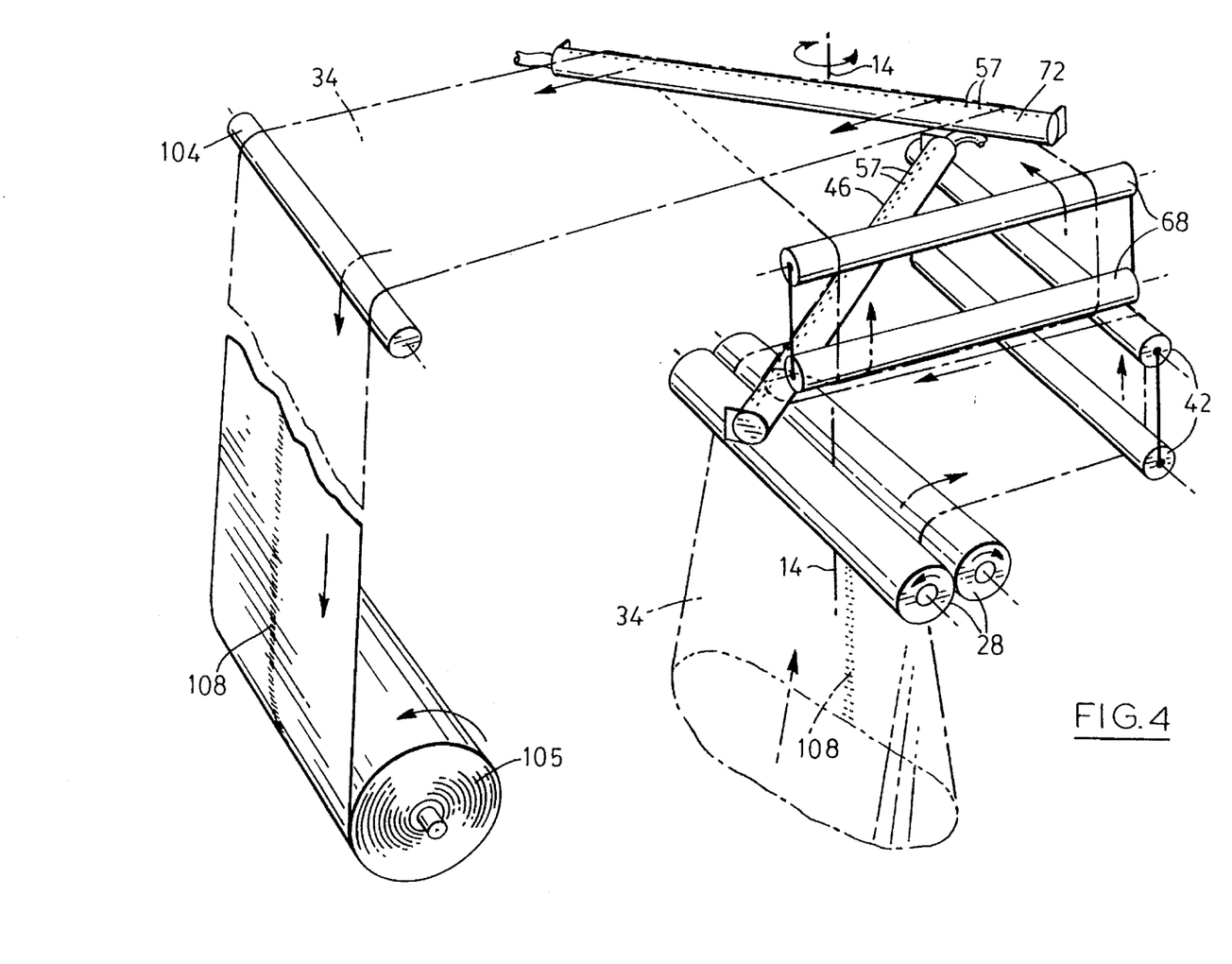
FIG. 4 is a similar view but showing how the film passes through the apparatus when the rotatable components are at extreme angular positions away from the neutral position.
Figure 5:
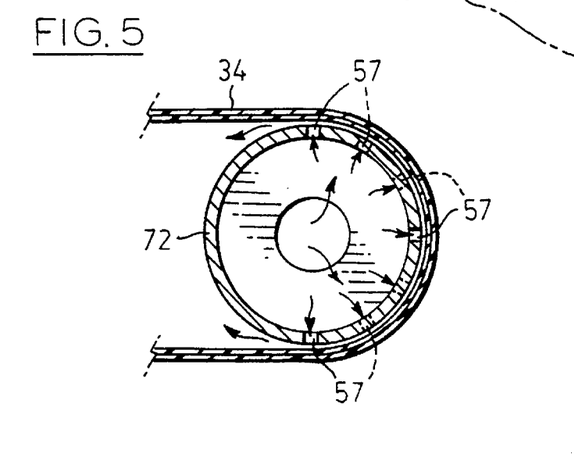
FIG. 5 is a sectional view along the line 5—5 of FIG. 3 showing the construction of a turning bar.

The operation of first motor 24 is controlled, in a manner which will be understood by a person skilled in the art, such that the rotor 12 together with a collapsing frame 30, nip rolls 28 and the first direction reverser 36 are rotated through 180° from the neutral position shown in FIGS. 1 to 3 in one direction to the extreme angular positions shown in FIG. 4. The motor 24 is then reversed to rotate the rotor 12, collapsing frames 30, nip rolls 28 and first film direction reverser 42 through 180° back to the neutral position shown in FIGS. 1 to 3, and then on in the same direction through 180° on the neutral position to the other extreme angular 3 positions. The motor 24 is reversed again to return the components to the neutral position and then repeat the operation previously described, and so on.

When the first motor 24 is operating as described above, the second motor 92 is operated (again in a manner in which will be understood by a person skilled in the art) to cause the first turning bar 46 to rotate in the same direction as the rotor 12 and its associated components, except that the first turning bar 46 only rotates through 135° as the rotor 12 and associated components rotate through 180°. Also, the gearing associated with the second film direction reverser 62 is such that the second reverser 62 only rotates through 90° while the first direction reverser 36 rotates through 180°. Similarly, the gearing associated with the second turning bar 72 is such that the second turning bar 72 only rotates through 45° while the second direction reverser 62 is rotated through 90°. It will be noted that FIG. 4 shows the extreme angular positions when the nip rolls 28 and first direction reverser 36 has been rotated through 180° in the anti-clockwise direction.

As previously mentioned, the neutral positions of the various rotatable components are shown in FIGS. 1 and 3 and the extreme angular positions of these components in one direction from neutral position are shown in FIG. 4. FIG. 3 shows the collapsing film 34 with a line of increased thickness 108 on its front layer as it approaches the nip rollers 28. At the exit roller 104, the line of thickness 108 appears on the rear layer of the film as indicated at arrow 108. FIG. 4 shows the same line of increased thickness 108 on the rear layer of the collapsing film 34 as it approaches the nip rollers 28. However, due to the different angular orientation of the rotatable components from the neutral position, the line of increased thickness 108 now appears on the front layer of the film 34. In the intermediate angular positions on the rotatable components, the line of increased thickness 108 appears at differing positions across the width of the film 34 on the wind-up roll 105 shown in FIG. 6.

The first and second turning bars 46, 72 pass substantially through, i.e. very close to, the central axis 14 about which rotation takes place, thereby simplifying gauge distribution on the wound up film. As described, this is effected in this embodiment of the invention by providing a first motor 24 for rotating the collapsing frames 30, the nip rolls 28 and the first direction reverser 36, and a second motor 92 for rotating the first turning bar 46, the second direction reverser 62 and the second turning bar 72, with the rotatable C-shaped brackets 50, 76 being provided to enable the first and second turning bars 46, 72 to pass substantially through the central axis 14.

Figure 7:
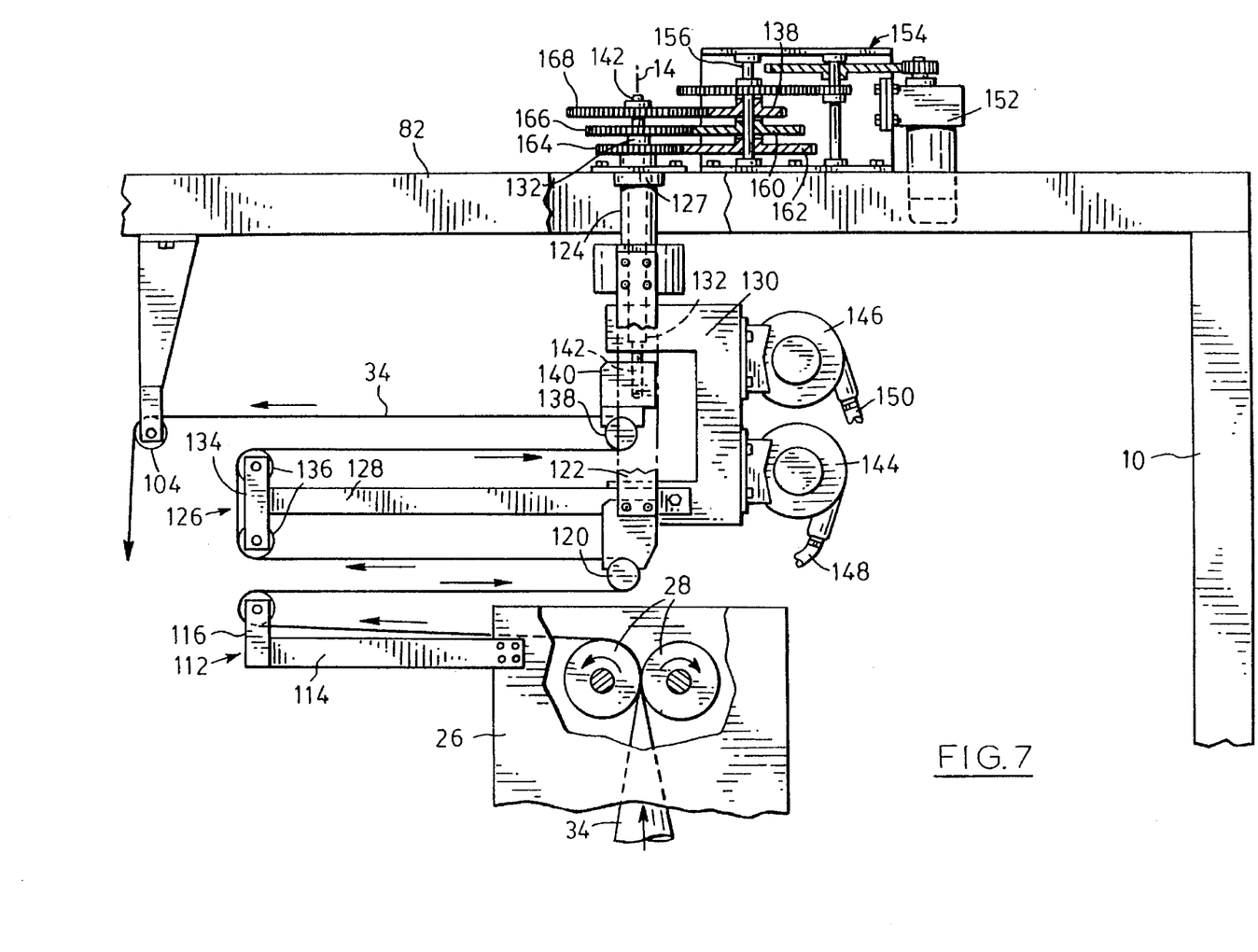
FIG. 7 is a diagrammatic side view, partly in section, of a second embodiment of the invention.
Figure 8:
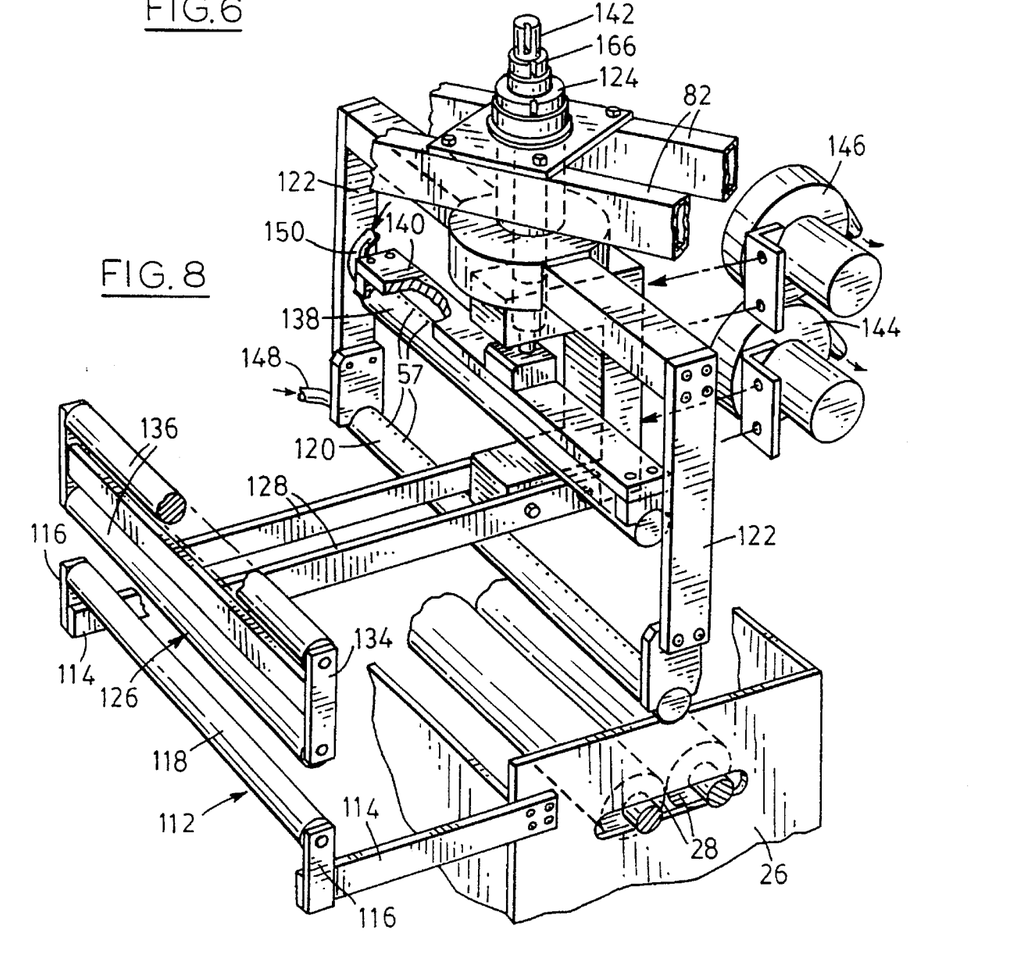
FIG. 8 is a perspective view of the apparatus of FIG. 7.

FIGS. 7 and 8 show another embodiment of the invention. As in the previous embodiment, nip rolls 28 are carried by the supporting structure 26 mounted on a rotor (as shown in FIG. 1) driven by a first motor (as shown in FIG. 1), with similar collapsing frames also being provided.

In this embodiment, the support structure 26 also carries a first horizontal film direction reverser 112 comprising radially extending arms 114 and a vertical roller frame 116 carrying a single horizontal rotatable roller 118. A first turning bar 120 is mounted on the bottom end of a C-shaped bracket 122, the upper ends of which are attached to an outer sleeve 124 rotatably mounted in a bearing 127 carried by the cross member 82 of the support frame 10. A second film direction reverser 126 comprises arms 128 which are a radial extension of the lower end of a C-shaped bracket 130 carried by an inner sleeve 132 which passes upwardly through the outer sleeve 124. A vertical roller frame 134 is mounted at the outer end of arm 128 and carries a pair of vertically spaced rollers 136. A second turning bar 138 is mounted beneath a bar carrier 140 carried at the lower end of a shaft 142 which passes upwardly through the inner sleeve 132. The bracket 130 carries air blowers 144, 146 for supplying air to the interior of the first and second turning bars 120, 138 through tubing 148, 150 respectively.

A second motor 152 and gear box 154 are mounted on cross member 82. The gear box 154 has an output shaft 156 carrying three drive gears 158, 160, 162 of progressively increasing diameter. The largest lowermost gear 162 meshes with a gear 164 carried by outer sleeve 124 associated with the first turning bar 120. The middle gear 160 of intermediate size meshes with a gear 166 larger than gear 144 and carried by inner sleeve 132 which is associated with second director reverser 126. The upper smallest gear 148 meshes with a gear 168 larger than gear 166 and carried by shaft 142 which is associated with the second turning member 138.

The embodiment illustrated in FIGS. 7 and 8 operates in a similar manner to the embodiment shown in the previous figures. In other words, the supporting structure 26, nip rolls 28 and first direction reverser 112 are rotated through 180° from the neutral position in both directions alternately, while at the same time first turning bar 120 is rotated through 135°, second direction reverser 126 is rotated through 90° and second turning bar 138 is rotated through 45° by second motor 152 and drive gears 164, 166, 168 respectively.

Thus, with the embodiment illustrated in FIG. 1, the gearing is within the support frame 10, whereas in the embodiment of FIGS. 7 and 8, the gearing is on top of the cross member 82. Also, in the embodiment of FIGS. 7 and 8 the first direction reverser 112 only has a single roller 118.

Figure 9:
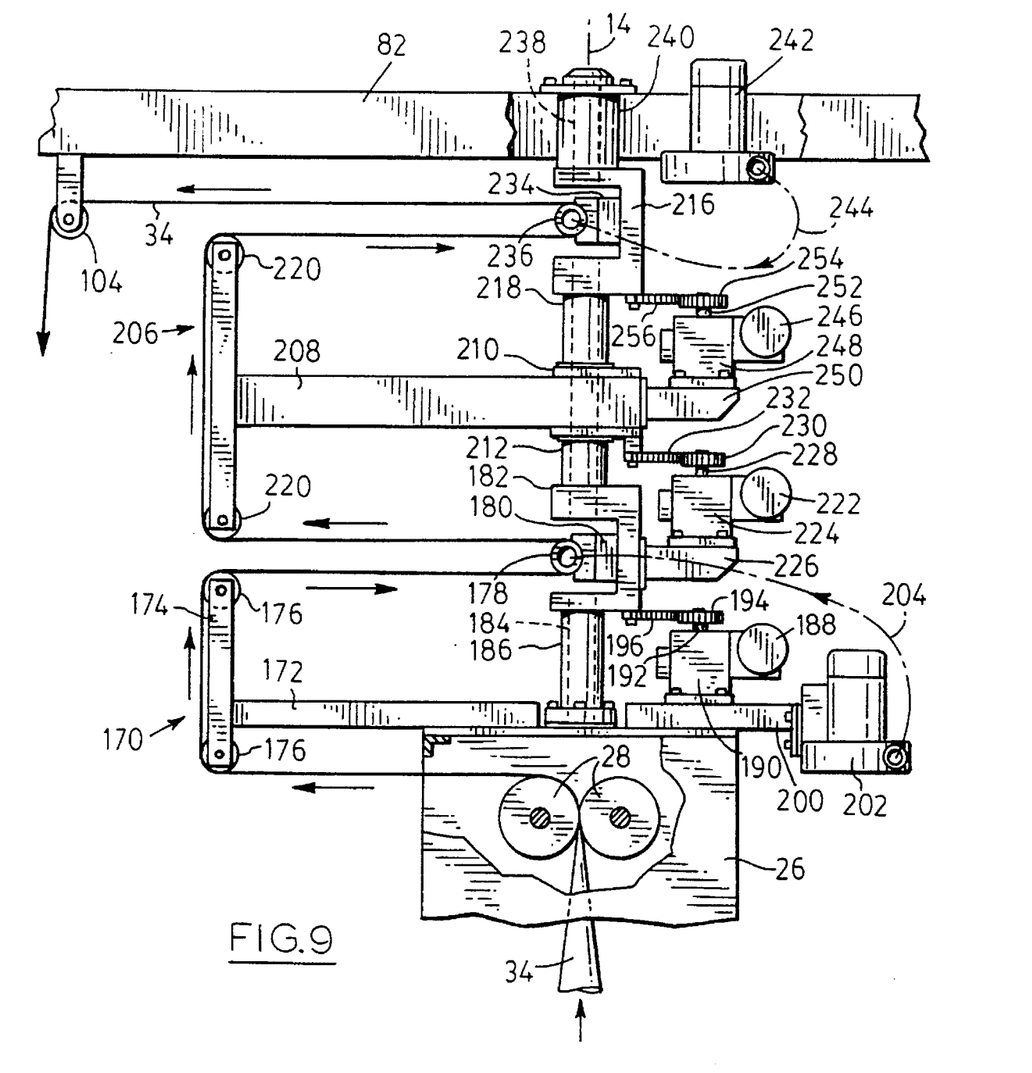
FIG. 9 is a diagrammatic side view of a third embodiment of the invention.
Figure 10:
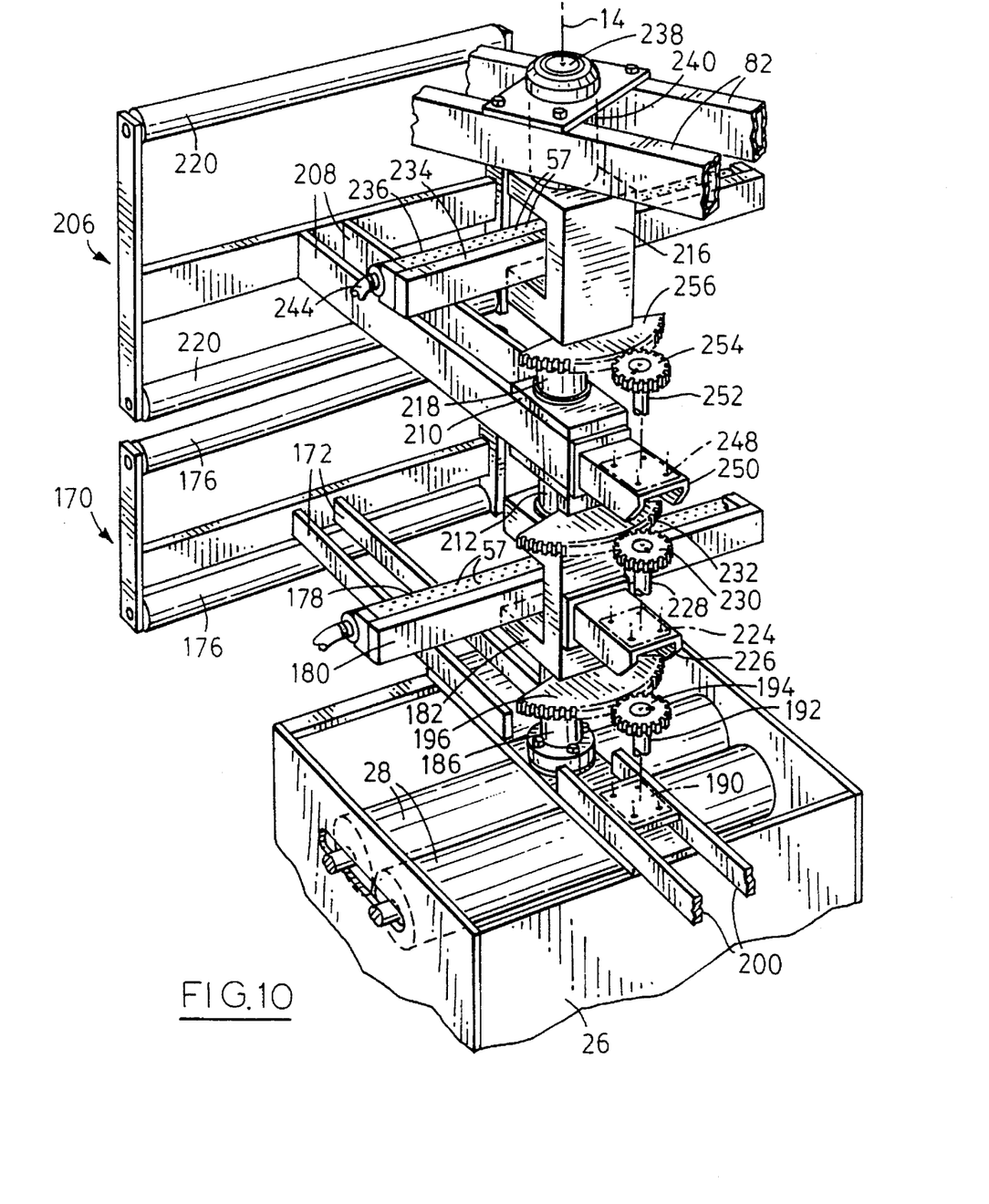
FIG. 10 is a perspective view of the apparatus of FIG. 9.

The embodiment of FIGS. 9 and 10 also has nip rolls 28 carried by supporting structure 26 rotated as before with collapsing frames by a first motor as shown in FIG. 1. In this embodiment, the support structure 26 carries a first direction reverser 170 with arms 172, roller frames 174 and a pair of vertically spaced rollers 176. A first turning bar 178 is mounted on an arm 180 carried by a first C-shaped bracket 182. A shaft 184 extends downwardly from the lower part of the C-shaped bracket 182 and is rotatably mounted in a cylindrical bearing 186 mounted on the top of the support structure 26, the shaft 184 being located on the central axis 14. A second motor 188 and gear box 190 are mounted on the top of the support structure 26, the gear box 190 having an upwardly extending vertical output shaft 192 carrying a drive gear 194. The lower end of C-shaped bracket 182 carried a gear segment 196 which meshes with drive gear 194. A rearwardly extending arm 200 secured to the top of the support structure 26 carries an air blower 202 which supplies air through tubing 204 to the interior of turning bar 178.

A second direction reverser 206 has radially extending arms 208 whose radially inner end has a cylindrical bearing 210 seated on the top of a cylindrical bearing 212 secured to the top part of the C-shaped bracket 182. A shaft 214 extends downwardly from the bottom part of a second C-shaped bracket 216 to pass through a cylindrical bearing 218 extending upwardly from the bearing 210, through the bearing 210 and through the bearing 212. The outer ends of arms 208 carry a roller frame 218 which in turn carries two vertically spaced horizontal rollers 220. A third electrically driven motor 222 and gear box 224 are mounted on an arm 226 secured to the first C-shaped bracket 182, the gear box 224 having a vertical output shaft 228 carrying a gear wheel 230. The inner end of arms 208 of the second direction reverser 206 carries a gear segment 232 in mesh with gear wheel 230.

As previously mentioned, the second C-shaped bracket 216 is mounted on top of the bearing 218 and has a shaft 214 extending downwardly from the lower part thereof. The bracket 216 carries an arm 234 on which a second turning bar 236 is mounted. A shaft 238 projecting upwardly from the top portion of bracket 216 is journalled in a cylindrical bearing 240 carried by cross member 82. The cross member 82 also carries an air blower 242 which supplies air through tubing 244 to the interior of second turning bar 236. A further electrically driven motor 246 and gear box 248 are mounted on an arm 250 secured to arms 208 of the second direction reverser 206, the gear box 248 having a vertical output shaft 252 carrying a gear wheel 254. The lower part of C-shaped bracket 216 carries a gear segment 256 meshing with gear wheel 254.

It will be noted that in FIG. 10 the various motors and gear boxes have been omitted to enable other parts to be more clearly seen.

The embodiment illustrated in FIGS. 9 and 10 operates in a similar manner to the previously described embodiments. In other words, supporting structure 26, nip rolls 28 and first reverser 170 are rotated through 180° from the neutral position in both directions alternately, while at the same time first turning bar 178 is rotated through 135°, second direction reverser 206 is rotated through 90° and second turning bar 236 is rotated through 45° by motors 188, 222 and 246 respectively. The operation of the four motors is synchronized appropriately for this purpose in a manner which will be readily apparent to a person skilled in the art.

It will be noted that in each embodiment the C-shaped brackets enable the first and second turning bars to be located substantially on, i.e. close to, the vertical axis of rotation, thereby facilitating gauge distribution.

Other embodiments of the invention will also be readily apparent to a person skilled in the art, the scope of the invention being defined in the appended claims.

We claim:

1. Apparatus for effecting gauge distribution in flattened tubular plastic film, said apparatus comprising:

collapsing means for collapsing upwardly vertically moving expanded tubular plastic film to a two layer flattened condition, said collapsing means being located above the upwardly moving expanded tubular plastic film and aligned with the longitudinal central axis thereof, said collapsing means being rotatable about said central axis, a first motor for rotating the collapsing means about said central axis through 180° in each direction from a neutral position, a first horizontal film direction reverser secured to the collapsing means for rotation therewith and laterally spaced from said central axis for reversing the direction of travel of said flattened film leaving the collapsing means from a radially outward direction away from said central axis to a radially inward direction toward said central axis, a first horizontal turning bar located above the collapsing means and extending substantially through said central axis for receiving said flattened film from the first direction reverser, said flattened film passing around the first turning bar and leaving said first turning bar in a radially outward direction, a first turning bar carrier carrying the first turning bar and rotatable about said central axis to rotate the first turning bar horizontally, and a second horizontal film direction reverser laterally spaced from said central axis for reversing the direction of travel of the flattened film leaving the first turning bar from a radially outward direction to a radially inward direction towards the central axis, a direction reverser carrier rotatable about said central axis and carrying the second film direction reverser for rotation therewith, a second horizontal turning bar located about the first turning bar and extending substantially through said central axis for receiving said flattened film from the second film direction reverser, said flattened film passing around the second turning bar and leaving said second turning bar in a radially outward direction, a second turning bar carrier carrying a second turning bar and rotatable about said central axis to rotate the second turning bar horizontally, second motor means for simultaneously rotating the first turning bar carrier to rotate the first turning bar about said central axis through 135° in each direction from a neutral position, rotating the second film direction reverser about said central axis through 90° in each direction from the neutral position and rotating the second turning bar carrier to rotate the second turning bar about said central axis through 45° in each direction from the neutral position simultaneously with said rotation of the collapsing means and first direction reverser by said first motor, and thereby distribute gauge variations in the two layer flattened film leaving the collapsing means across the width of the flattened film.

2. According to claim 1 wherein said second motor means comprises a single motor with an output shaft carrying first, second and third gears, the first turning bar carrier having a fourth gear connected thereto engaging the first gear, the direction reverser carrier having a fifth gear connected thereto engaging the second gear, and the second turning bar carrier having a sixth gear connected thereto engaging the third gear.

3. Apparatus according to claim 2 wherein the output shaft extends vertically adjacent the first turning bar carrier, the direction reverser carrier and the second turning bar carrier, the first, second and third gears being vertically spaced along the output shaft, and the fourth, fifth and sixth gears being carried by the first turning bar carrier, the direction reverser carrier and the second turning bar carrier respectively in vertically spaced relationship.

4. Apparatus according to claim 2 wherein the output shaft extends vertically at a location above the first turning bar carrier, the direction reverser carrier and the second turning bar carrier, the first, second and third gears being vertically spaced along the output shaft, the fourth, fifth and sixth gears being carried by first, second and third vertical shafts, the first shaft extending from the first turning bar carrier, the second shaft extending from the direction reverser carrier and the third shaft extending from the second turning bar carrier, one of said shafts being an outer annular shaft, another of said shafts being a middle annular shaft within the outer annular shaft, and the other shaft being an inner shaft within the middle annular shaft.

5. Apparatus according to claim 1 wherein the second motor means comprises a second motor carried for rotation with the collapsing means and drivingly connected to the first turning bar carrier, a third motor carried by the first turning bar carrier and drivingly connected to the direction reverser carrier, and a fourth motor carried by the direction reverser carrier and drivingly connected to the second turning bar carrier.

6. Apparatus according to claim 1 wherein the first turning bar carrier comprises a C-shaped bracket carrying the first turning bar within the C-shape thereof.

7. Apparatus according to claim 6 wherein the second turning bar carrier comprises a second C-shaped bracket mounted above and rotatable relative to the first C-shaped bracket, said second C-shaped bracket carrying the second turning bar within the C-shape thereof.

8. Apparatus according to claim 7 wherein the direction reverser carrier carrying the second film direction reverser comprises a radially extending arm located between the first and second C-shaped brackets and rotatable relative thereto.

9. Apparatus according to claim 8 wherein the second motor means comprises a second motor carried by the main frame and having a vertical output shaft carrying the vertically spaced gear wheels, said first C-shaped bracket being drivingly connected to a first one of said gear wheels, said second direction reverser being drivingly connected to a second one of said gear wheels, and said second C-shaped bracket being drivingly connected to a third one of said gear wheels.

10. Apparatus according to claim 8 wherein said second motor means comprises a second motor drivingly connected to the first C-shaped bracket, a third motor carried by the first C-shaped bracket and drivingly connected to the second direction reverser carrier, and a fourth motor carried by the second direction reverser carrier and drivingly connected to the second C-shaped bracket.

11. Apparatus according to claim 1 having main frame, said main frame having a cross member above the first turning bar, the second direction reverser and the second turning bar, and the second motor means is mounted on said cross member, said second motor means having a vertical output shaft carrying three vertically spaced gear wheels, and said apparatus also includes a vertical outer drive sleeve journalled in said cross member and carrying the first turning bar, an inner drive sleeve journalled in the outer sleeve and carrying the second direction reverser, and an inner drive shaft journalled in the inner sleeve and carrying the second turning bar, the outer sleeve being drivingly connected to a first one of said gear wheels, the inner sleeve being drivingly connected to a second one of said gear wheels, and the inner shaft being drivingly connected to a third one of said gear wheels.

12. Apparatus according to claim 11 wherein the outer sleeve carries a first C-shaped bracket having the first turning bar carrier mounted at a lower end thereof, the inner sleeve carries a second C-shaped bracket within the first C-shaped bracket having the second direction reverser carrier mounted at a lower end thereof, and the inner shaft has the second turning bar carrier mounted on a lower end thereof.

\* \* \* \* \*